US009461278B2

(12) United States Patent
Gaikwad et al.

(10) Patent No.: US 9,461,278 B2
(45) Date of Patent: Oct. 4, 2016

(54) METHOD FOR PROVIDING A STRETCHABLE POWER SOURCE AND DEVICE

(71) Applicant: Research Foundation of the City University of New York, New York, NY (US)

(72) Inventors: Abhinav Gaikwad, Berkeley, CA (US); Dan Steingart, Princeton, NJ (US)

(73) Assignee: Research Foundation of the City University of New York, New York, NY (US)

( * ) Notice: Subject to any disclaimer, the term of this patent is extended or adjusted under 35 U.S.C. 154(b) by 591 days.

(21) Appl. No.: 13/860,226

(22) Filed: Apr. 10, 2013

(65) Prior Publication Data

US 2013/0280580 A1    Oct. 24, 2013

Related U.S. Application Data

(60) Provisional application No. 61/622,181, filed on Apr. 10, 2012.

(51) Int. Cl.
  *H01M 2/02* (2006.01)
  *H01M 4/66* (2006.01)
  *H01M 4/75* (2006.01)
  *H01M 6/06* (2006.01)

(52) U.S. Cl.
  CPC ......... *H01M 2/0207* (2013.01); *H01M 2/0275* (2013.01); *H01M 4/667* (2013.01); *H01M 4/668* (2013.01); *H01M 4/75* (2013.01); *H01M 2/021* (2013.01); *H01M 6/06* (2013.01); *Y10T 156/10* (2015.01)

(58) Field of Classification Search
  CPC . H01M 2/0207; H01M 2/0275; H01M 4/668
  USPC .......................... 429/127, 235–236; 156/60; 29/623.1–623.5
  See application file for complete search history.

(56) References Cited

U.S. PATENT DOCUMENTS

2011/0097624 A1\*  4/2011  Bhatt et al. ................... 429/163
2012/0276434 A1   11/2012  Gaikwad

OTHER PUBLICATIONS

Gaikwad, Abhinav M., Gregory L. Whiting, Daniel A. Steingart, and Ana Claudia Arias. "Highly Flexible, Printed Alkaline Batteries Based on Mesh-Embedded Electrodes." Adv. Mater. Advanced Materials 23.29 (2011): 3251-255.\*
Gaikwad et al.; Highly Stretchable Alkaline Batteries Based on an Embedded Conductive Fabric; Advanced Materials vol. 24; issue 37; pp. 5071-5076; Sep. 25, 2012.

\* cited by examiner

*Primary Examiner* — James Lee
(74) *Attorney, Agent, or Firm* — Peter J. Mikesell; Schmeiser, Olsen & Watts, LLP

(57) ABSTRACT

Disclosed in this specification is a method for providing a stretchable power source and corresponding device. The device has at least two stretchable fabrics with silver-coated fibers. Each fabric has cathodic and anodic materials, respectively, deposited between the fibers. The fibers are sealed with an elastomeric pouch having an electrolyte. The stretchable power source has substantially no change in discharge capacity when stretched from 0% strain to 100% strain.

11 Claims, 3 Drawing Sheets

METHOD FOR PROVIDING A STRETCHABLE POWER SOURCE AND DEVICE

CROSS-REFERENCE TO RELATED APPLICATIONS

This application claims priority to and the benefit of U.S. provisional patent application Ser. No. 61/622,181 (filed Apr. 10, 2012), which application is incorporated herein by reference in its entirety.

STATEMENT REGARDING FEDERALLY FUNDED RESEARCH OR DEVELOPMENT

This invention was made with government support under contract no. AR0000114 awarded by the Advanced Research Projects Agency Energy (ARPA-e) Agile Delivery of Electrical Power Technology (ADEPT). The government has certain rights in the invention.

BACKGROUND OF THE INVENTION

In the past decade, stretch electronics with a wide variety of functionality such as biological sensors, solar cells, polymer light-emitting devices, transistors, active matrix displays and photo-detectors have been demonstrated. While there has been progress on power sources with similar mechanical properties, there is still a significant gap. Previously supercapacitors based on single-wall nanotubes (SWNT) deposited on polydimethyl siloxane (PDMS), carbon nanotubes (CNTs) embedded in fabric and conducting polymer on compliant substrates have been demonstrated, but these devices are suited to short term energy storage and cannot be used to power stand-alone devices.

A conventional battery has two non-compliant conductors as the current collector, anode and cathode electrodes, a separator in between the electrodes to prevent electronic contact and electrolyte to provide ionic connection. The anodes and cathodes are typically a mix of electrochemically active particles mixed with a conductive material (e.g. carbon) and a polymeric/cellulose binder. These electrodes are brittle composites and have limited flexibility. Degradations in capacity during fatigue tests are generally due to formation of cracks and loss in electrical contact within the electrode during flexing.

Flexible devices (e.g. wearable devices) require a power source with a similar form factor. For example, U.S. Publication 20120276434 (Gaikwad) teaches a flexible matter formed by embedding an electroactive material inside a nylon/metal mesh. This approach provides a flexible electrode. The content of U.S. Publication 20120276434 is hereby incorporated by reference in its entirety.

The discussion above is merely provided for general background information and is not intended to be used as an aid in determining the scope of the claimed subject matter.

BRIEF DESCRIPTION OF THE INVENTION

An advantage that may be realized in the practice of some disclosed embodiments is the provided power source is not only flexible but is also stretchable.

In one embodiment, the power source has at least two stretchable fabrics with silver-coated fibers. Each fabric has cathodic and anodic materials, respectively, deposited between the fibers. The fibers are sealed with an elastomeric pouch having a polymer gel electrolyte. A pair of electrodes may extend through the pouch to provide an electrical connection to the environment. The stretchable power source has substantially no change in discharge capacity when stretched from 0% strain to 100% strain.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Disclosed in this specification is a stretchable $MnO_2$—Zn cell based on a silver fabric embedded with $MnO_2$ and Mn particles. The fabric acts as a current collector and mechanical support for the electrochemically active particles. The embedded fabric electrodes with a polymer gel electrolyte (PGE) were sealed inside an elastomeric pouch. $MnO_2$—Zn chemistry has advantages such as high-energy density, low cost and is environmentally friendly. The commercially available fabric was made from a silver coated nylon thread weaved onto a rubber matrix (Sparkfun Electronics), which imparts stretchable characteristics to the fabric. The thickness of the fabric under no strain was 530 micron and decreased to 350 micron when stretched by 100%. The fabric can be stretched in both the x and y directions up to a 100% strain without degradation in its elasticity and conductivity.

The fabric was available in the form of 12 inch by 13 inch sheets and was cut into 2 inch by 2 inch squares. The fabric was embedded by completely soaking it in homogeneous diluted ink for 2 minutes. The cathode ink ("$MnO_2$ ink" was a mixture of $MnO_2$2, graphite, binder and water). The anode ink ("Zn ink" was a mixture of Zn, ZnO, $Bi_2O_3$, binder and ethylene glycol solvent). During the embedding step the ink occupied the open spaces available in the fabric. After 2 minutes, excess ink was removed by blotting with an absorbent. The absorbent removed unsupported ink that was not absorbed between the fibers. During the embedding process, the solvents did not chemically react with the rubber network and the elastic characteristic of the fabric was maintained even when loaded. The excess removal was a repeatable process, indicating that the adhesion of the electrochemically active ink was a self-limiting process. The fabric was then heated at 70° C. for 30 minutes to remove residual solvent.

The $MnO_2$ and Zn electrodes had an average loading of 16 mg per square centimeter and 18 mg per square centimeter, respectively. The embedded fabrics were then used to make a primary $MnO_2$—Zn alkaline cell (each electrode's dimension being 2 cm by 1 cm) with a PGE. FIG. 1 is a schematic diagram of the cell.

Figure 1A:
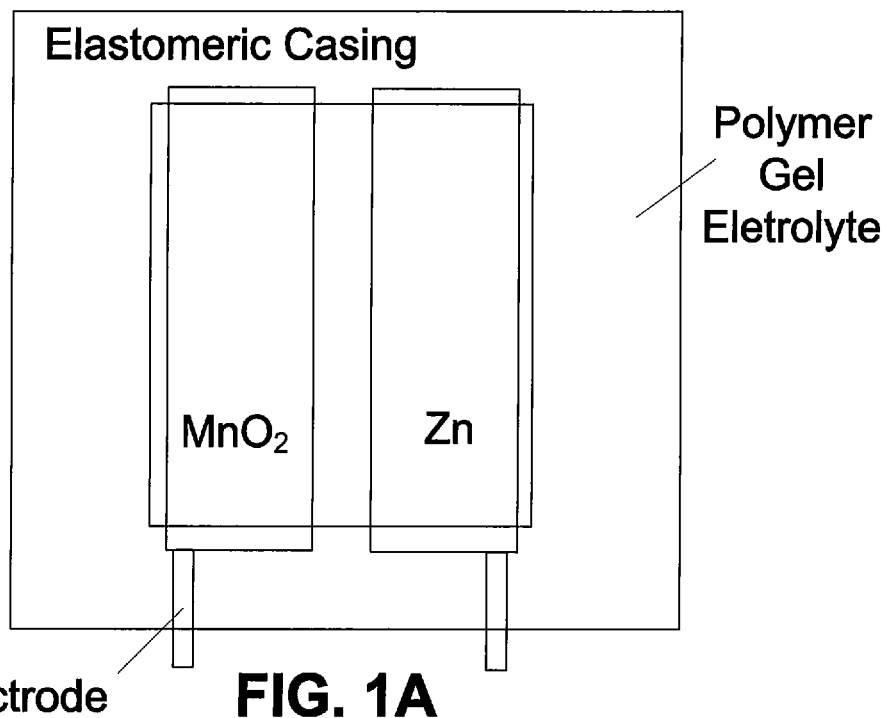
FIG. 1A and FIG. 1B to schematic top and side views, respectively, of an exemplary stretchable power source.
Figure 1B:
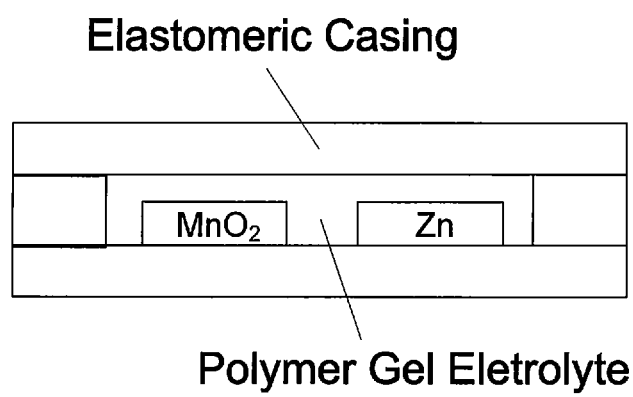

Referring to FIG. 1A and FIG. 1B, a planar electrode configuration was used where the $MnO_2$ and Zn electrodes were placed side by side with a gap of 4 mm. The cell was assembled using three sheets of highly compliant acrylic elastomers. Electrodes provide an electrical connection to the environment. A chamber was cut in one of the elastomer sheets in order to house the electrodes and the electrolyte. The well was then sealed using two separate sheets of elastomer.

Figure 2A:
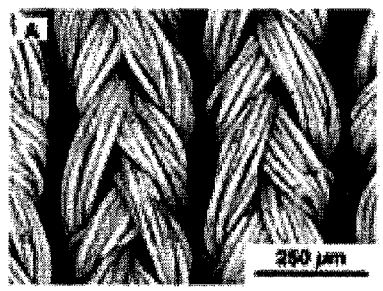
FIG. 2A and FIG. 2B are micrographs prior to particles being embedded.
Figure 2B:
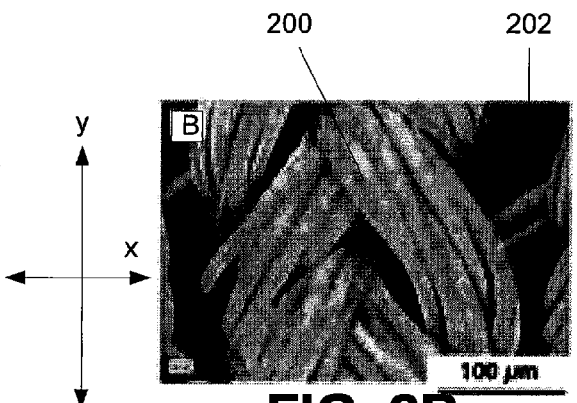

FIG. 2A and FIG. 2B are images prior to coating. FIG. 2A shows the fabric under 0% strain. The fabric comprises fiber bundles of 12-14 silver-coated nylon fibers which are intertwined over a stretchable rubber network. The rubber network imparts the elastic characteristics to the fabric. FIG. 2B shows the element mapping of the fabric 200 (silver on nylon threads) with rubber network 202.

Figure 2C:
FIG. 2C and FIG. 2D are micrographs of the fibers after $MnO_2$ has been embedded.
Figure 2D:
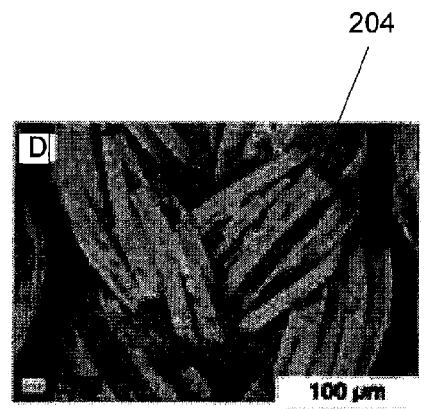

FIG. 2C and FIG. 2D are SEM micrographs after $MnO_2$ has been embedded. As observed from the micrograph, $MnO_2$ particles 204 were absorbed in the void space between the fibers.

Figure 2E:
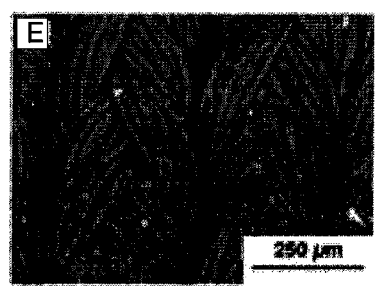
FIG. 2E and FIG. 2F are micrographs of the fibers after Zn has been embedded.
Figure 2F:
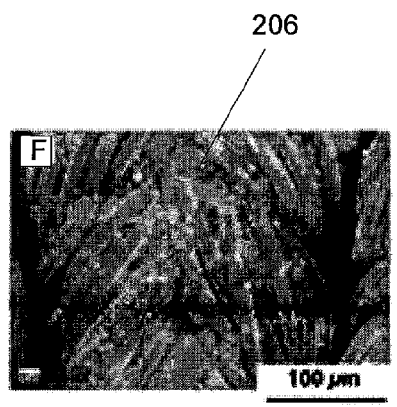

FIG. 2E and FIG. 2F are SEM micrographs after Zn has been embedded. Zn particles 206 were absorbed in the void space between the fibers.

The mechanical integrity of the imbedded electrode under strain was studied in the x and y directions while observing the electrode under a microscope for delamination or flaking of the particles. With reference to FIG. 2A and FIG. 2B the x and y directions are defined relative to the direction of fabric 200 with the y direction being parallel to the unit weave of the fabric 200 and the x direction being perpendicular to the unit weave of the fabric 200. The rubber network had an arrangement that was perpendicular to the unit weave of the fabric. In practice, no delamination was observed after stretching in both the x and y directions for either the $MnO_2$ or Zn treated fabrics. The particles absorbed between the fibers remained in place and the stretching was insufficient to dislodge these particles.

Figure 3A:
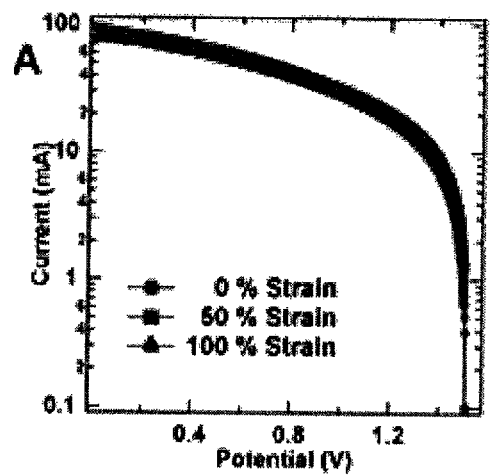
FIG. 3A, FIG. 3B and FIG. 3C are graphs of the results of electrochemical testing of one exemplary stretchable power source.
Figure 3B:
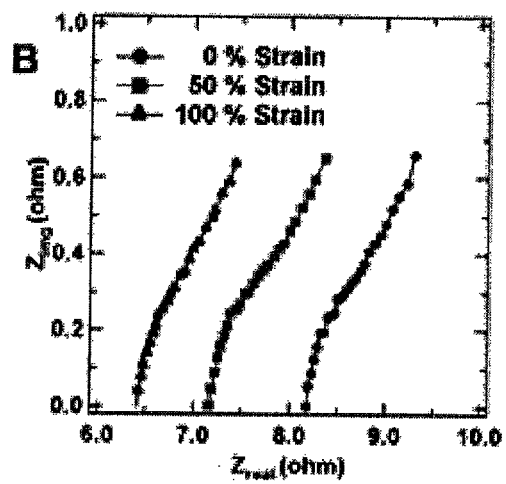
Figure 3C:
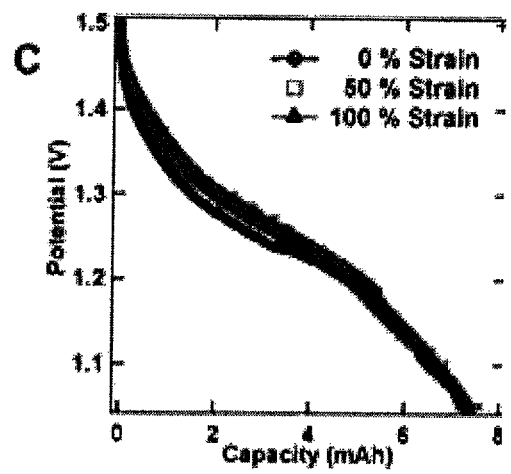

FIG. 3A, FIG. 3B and FIG. 3C show the results of electrochemical testing of the stretchable $MnO_2$—Zn cell under varying strain. FIG. 3A shows the polarization curves of the cells from OCV (1.5V) to 0V at a scan rate of 50 mV per second and at 0, 50 and 100% strain in the x direction. Stretching the cells had no effect on polarization characteristics of the cells. The cells gave a polarization current of 33 mA at 0.9V.

FIG. 3B depicts electrochemical impedance spectroscopy (EIS) results. EIS was performed on the cell at varying levels of strain (%) to measure the change in impedance upon stretching. EIS was conducted with 10 mV fluctuating potential from 100,000 Hz to 10 Hz at OCV (1.5 V). The only observable change was in ohmic loss: a shift in the X-axis. In EIS, the intercept on the X-axis is the resistance of the PGE between two electrodes. As seen in FIG. 3B, the resistance of the PGE between the electrodes decreased as the cell was stretched to 50 and 100% strain. The specific conductivity of the PGE is independent of the stretch of the cell; hence the decrease in the resistance can be explained by the increase in the electrode footprint. The decrease in the ohmic loss (IxR) during discharge upon stretching is too small to observe any difference in capacity. Critically, the curve above the X-axis is nearly constant at different strains (%) indicating no degradation of the electrode upon stretching.

FIG. 3C shows the discharge performance of the cells at 0, 50 and 100% strain at a discharge rate of 0.35 mA. The capacity of the battery was limited by the weight of $MnO_2$ particles embedded in the fabric. The dry weight of the $MnO_2$ particles was 12.8 mg per square centimeter (80% of total loading weight) and had a maximum first-electron reaction capacity of 4 mAh per square centimeter (3.2 mg-1 mAh). The three cells had a discharge capacity of 7.75 mAh (3.875 mAh per square centimeter, electrode area=2 square centimeters) when discharged to 1.05 V. No drop in discharge capacity was observed even at 100% strain, indicating that contact between the particles and the fabric was maintained. The slight fluctuations in discharge are within experimental errors.

The disclosed stretchable power source has been used to power a red light emitting diode (LED). The cells were able to power a red LED even when stretched to 150% in the x direction and twisted by 90 degrees from a planar configuration. The fabric had a rated strain limit of 100% in the x and y direction. Beyond 100% there was degradation in the elastic characteristics of the fabric.

The embodiment depicted in the figures show a particular number of pieces of fabric. In another embodiments additional pieces of fabric may be connected, in series of in parallel, to alter the electrical characteristics of the power source. Such other embodiments are contemplated for use as part of the claimed power source.

EXEMPLARY EMBODIMENT

The stretch silver fabric (Sparkfun Inc.) was first cut into 2 inch by 2 inch square before the imbedding process. Two sheets of silver fabric were each embedded with $MnO_2$ and Zn, respectively, by soaking in a dilute ink of $MnO_2$ and Zn for 2 minutes. The $MnO_2$ ink was a mixture of 31% $MnO_2$ (Tronox 10 micrometer), 7% graphite (Timcal-KS6), 14% Polystyrene-butadiene binder (LICO Technology Corp, 15% wt. loading) and 48% deionized (DI) water. The $MnO_2$ ink was made by mixing $MnO_2$ and graphite powder in a pestle for 10 minutes until a homogenous mixture was formed. Polystyrene-butadiene binder and water were added to the powder and mixed for an additional 10 minutes. The Zn ink was a mixture of 48% Zn (Sigma Aldrich), 5% ZnO (Inframat Inc.), 3% $Bi_2O_3$ (Sigma Aldrich), 14% Polystyrene-butadiene binder and 30% ethylene glycol. The Zn ink was made by mixing Zn, ZnO and $Bi_2O_3$ particles in a pestle for 10 minutes until a homogenous mixture was formed. Polystyrene binder was added to the mixture and mixed for 5 minutes. Ethylene glycol was then added mixed for 10 minutes. The ink was poured immediately on the silver fabric after it was made. After soaking for 2 minutes, the excess of ink was removed and the embedded fabric was baked in an oven at 70° C. for 30 minutes to remove residual solvent.

An electrolyte solution of 6M KOH and 0.4 M ZnO was prepared by mixing an appropriate weight of KOH pellets (Sigma Aldrich) and ZnO powder (Sigmal Aldrich) with deionized water. The solution was stirred until a clear solution was formed. The polymer gel electrolyte (PGE) was prepared by mixing 1.6% polyacrylic acid (Sigmal Aldrich, m.w. 1,250,000) with the liquid electrolyte. The mixture was then stirred overnight at 60° C. until a clear gel was formed. The high viscosity of the PGE aids in cell packaging.

Scanning electron microscope (SEM) microscopy and energy-dispersive x-ray spectroscopy (EDS) were done on a TM 3000 (Kitachi) fited with an EDS unit (Bruker). Polarization and EIS experiments were carried out using a VERSASTAT 4 potentiostat. Discharge experiments were carried out in a custom-made galvanostat (Ardustat). Optical images of the electrodes during stretching were captured using an Omano microscope fitted with Flea2 digital camera (Point Grey Research, Inc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stretchable power source comprising:
   a first stretchable fabric comprising silver-coated first polymeric fibers and Zn deposited between the first polymeric fibers;
   a second stretchable fabric comprising silver-coated second polymeric fibers and $MnO_2$ deposited between the second polymeric fibers;
   an electrolyte;
   an elastomeric pouch containing the electrolyte, the first stretchable fabric and the second stretchable fabric;
   wherein the first stretchable fabric further comprises a first rubber matrix, the first rubber matrix and the first polymeric fibers being perpendicular to one another.

2. The stretchable power source as recited in claim 1, wherein the second stretchable fabric further comprises a second rubber matrix, the second rubber matrix and the second polymeric fibers being perpendicular to one another.

3. The stretchable power source as recited in claim 1, wherein the first polymeric fibers are nylon fibers.

4. The stretchable power source as recited in claim 3, wherein the second polymeric fibers are nylon fibers.

5. The stretchable power source as recited in claim 1, wherein the first stretchable fabric is formed by intertwining a plurality of individual fibers into a fiber bundle, the first stretchable fabric comprising a plurality of such fiber bundles arranged parallel one another.

6. The stretchable power source as recited in claim 1, wherein the stretchable power source has substantially no change in discharge capacity as the stretchable power source is stretched from 0% strain to 100% strain.

7. The stretchable power source as recited in claim 1, wherein the electrolyte is a polymer gel electrolyte.

8. A method for forming a stretchable power source, the method comprising:
   soaking a first stretchable fabric comprising silver-coated first polymeric fibers in a first suspension comprising Zn particles and a first liquid;
   permitting a portion of the Zn particles to become embedded in the first polymeric fibers;
   removing the Zn particles that were not embedded in the first polymeric fibers;
   drying to remove the first liquid;
   soaking a second stretchable fabric comprising silver-coated second polymeric fibers in a second suspension comprising $MnO_2$ particles and a second liquid;
   permitting a portion of the $MnO_2$ particles to become embedded in the second polymeric fibers;
   removing the $MnO_2$ particles that were not embedded in the second polymeric fibers;
   drying to remove the second liquid;
   sealing the first stretchable fabric, the second stretchable fabric and an electrolyte within an elastomeric pouch to provide a stretchable power source; wherein the first stretchable fabric further comprises a first rubber matrix, the first rubber matrix and the first polymeric fibers being perpendicular to one another;
   the second stretchable fabric further comprises a second rubber matrix, the second rubber matrix and the second polymeric fibers being perpendicular to one another.

9. The method as recited in claim 8, wherein the stretchable power source has substantially no change in discharge capacity as the stretchable power source is stretched from 0% strain to 100% strain.

10. The method as recited in claim 8, wherein the electrolyte is a polymer gel electrolyte.

11. The method as recited in claim 8, wherein the first stretchable fabric and second stretchable fabric are separated by a gap filled with the electrolyte.

* * * * *